US009205816B2

(12) United States Patent
Kobana et al.

(10) Patent No.: US 9,205,816 B2
(45) Date of Patent: Dec. 8, 2015

(54) VEHICLE EMERGENCY EVACUATION DEVICE

(75) Inventors: Masumi Kobana, Fuji (JP); Shinya Kawamata, Mishima (JP)

(73) Assignee: TOYOTA JIDOSHA KABUSHIKI KAISHA, Toyota-Shi (JP)

( * ) Notice: Subject to any disclaimer, the term of this patent is extended or adjusted under 35 U.S.C. 154(b) by 48 days.

(21) Appl. No.: 13/499,625

(22) PCT Filed: Jul. 11, 2011

(86) PCT No.: PCT/JP2011/065818
§ 371 (c)(1),
(2), (4) Date: Mar. 30, 2012

(87) PCT Pub. No.: WO2013/008299
PCT Pub. Date: Jan. 17, 2013

(65) Prior Publication Data
US 2013/0018549 A1    Jan. 17, 2013

(51) Int. Cl.
*B60T 7/14* (2006.01)
*B60T 7/02* (2006.01)
(Continued)

(52) U.S. Cl.
CPC . *B60T 7/14* (2013.01); *B60K 28/06* (2013.01); *G08B 21/02* (2013.01); *G08G 1/166* (2013.01); *G08G 1/167* (2013.01); *B60W 2540/26* (2013.01)

(58) Field of Classification Search
CPC .................... B60N 2/2863; B60W 2050/0071; B60W 2050/0073; B60W 2050/0078; B60W 30/04
USPC ...................................................... 701/41, 70
See application file for complete search history.

(56) References Cited

U.S. PATENT DOCUMENTS 4,951,199 A  *  8/1990  Whitehead ....................... 701/41
7,164,117 B2 *  1/2007  Breed et al. .................... 250/221
(Continued)

FOREIGN PATENT DOCUMENTS

CN    2478835 Y    2/2002
JP    06-107031 A   4/1994
(Continued)

OTHER PUBLICATIONS

International Search Report of PCT/JP2011/065818 issued Aug. 9, 2011 and Written Opinion.

*Primary Examiner* — John Q Nguyen
*Assistant Examiner* — Kyung Kim
(74) *Attorney, Agent, or Firm* — Kenyon & Kenyon LLP

(57) ABSTRACT

In a vehicle emergency evacuation device which stops a running vehicle automatically or keeps a stop state of a stopped vehicle in a driver's emergency, a stop keeping process is executed to keep the stop state without conducting an intention confirmation process of the execution start of an emergency evacuation process when the emergency evacuation process is required, e.g. when an abnormality or a deterioration in the driver's condition arises or when the driver requests the emergency evacuation process, under a condition that the vehicle has stopped before a signal, a road crossing or a railroad crossing, thereby ensuring the safety of the vehicle. Moreover, there are provided a structure in which the stop site of the vehicle in the execution of automatic vehicle stop control is determined depending upon whether the running road is a driveway, a highway, or a normal road; and a structure that judges whether or not to permit an override to the emergency evacuation process after the execution start of the emergency evacuation process based on a passenger's motion.

7 Claims, 5 Drawing Sheets

(51) Int. Cl.
*B62D 6/00* (2006.01)
*G08B 21/02* (2006.01)
*G08G 1/16* (2006.01)
*B60K 28/06* (2006.01)

(56) References Cited

U.S. PATENT DOCUMENTS

2004/0039513 A1\* 2/2004 Knoop et al. .................... 701/70
2008/0154629 A1\* 6/2008 Breed et al. ........................ 705/1
2009/0210114 A1\* 8/2009 Baumann et al. ............... 701/45

FOREIGN PATENT DOCUMENTS

| JP | 07-76235 A | 3/1995 |
| JP | 2003063373 A | 3/2003 |
| JP | 2003-157493 A | 5/2003 |
| JP | 2004-310260 A | 11/2004 |
| JP | 2005-132183 A | 5/2005 |
| JP | 2005-316889 A | 11/2005 |
| JP | 2007-326429 A | 12/2007 |
| JP | 2007-331652 A | 12/2007 |
| JP | 2008-305190 A | 12/2008 |
| JP | 2009-227141 A | 10/2009 |

\* cited by examiner

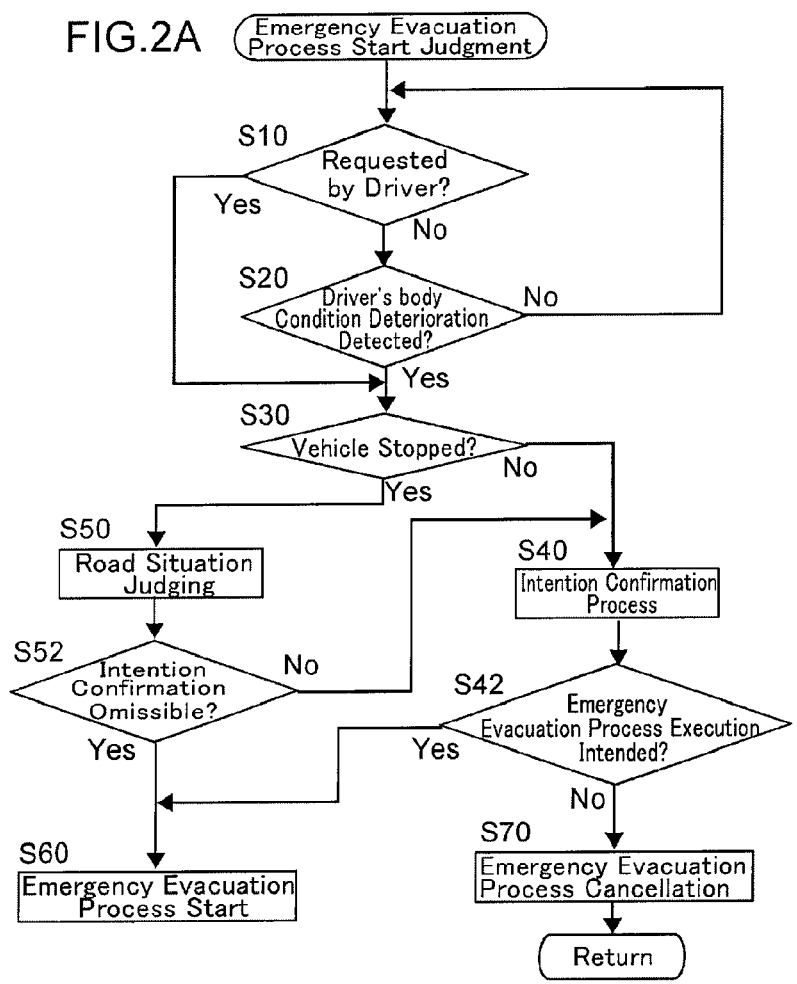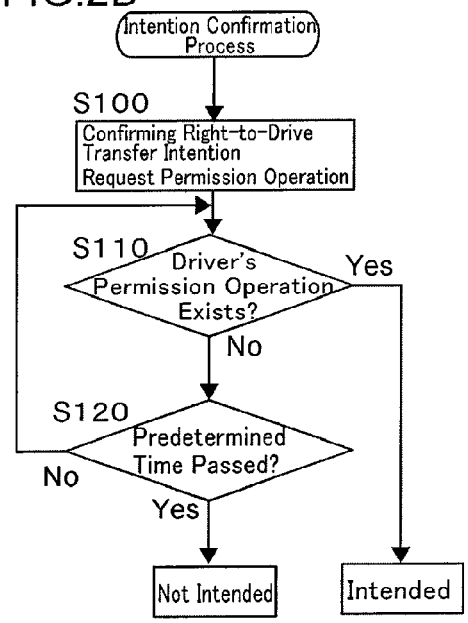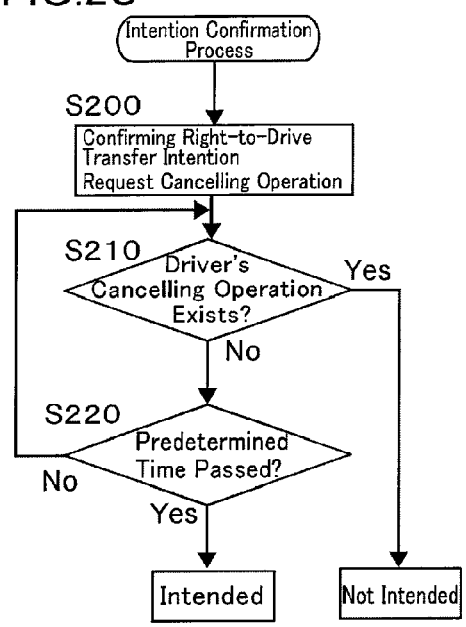

Passenger Seat

VEHICLE EMERGENCY EVACUATION DEVICE

This is a 371national phase application of PCT/JP 2011/065818filed 11 Jul. 2011, the contents of which are incorporated herein by reference.

TECHNICAL FIELD

The present invention relates to an emergency evacuation device of a vehicle, such as an automobile, which device stops automatically a running vehicle or keeps a stopped vehicle in its stopped state in a driver's emergency.

BACKGROUND ART

In the field of the driving support technique for vehicles, such as automobile, there is proposed an emergency evacuation device which executes an emergency evacuation process to stop a vehicle automatically during the driving of the vehicle irrespective of a braking operation of a driver (an operation of a brake pedal, etc.) when the continuation of its driving becomes difficult due to a deterioration, etc. of the driver's body condition. For example, in the patent document 1, it is described to detect a driver's consciousness lowering (a symptom of napping) by measuring a driver's heart rate, a time period without steering, a time period without blinking, etc. (through monitoring a driver's face with a camera) and to execute an automatic vehicle stop control when the driver's consciousness lowering repeatedly occurs even if the driver is prompted to awake. In the patent document 2, it is also proposed to execute an automatic stop of a vehicle at a deceleration, set in consideration of the possibility of a collision with a frontward obstacle, when a driver's reaction is absent or dull even if a warning for awake is given at a detection of a driver's nap based on a pulse (sphygmus) change or when the driver requests by himself the automatic vehicle stop through a switch or a command input device because of feeling the difficulty in keeping the driving due to an abnormality in his/her body. Further, the patent document 3 proposes a vehicle stopping device constructed such that a driver's consciousness lowering or napping is judged by using a camera to detect if a driver's face is not directed toward the vehicle front or if driver's eyes have been closed continuously for a predetermined time, etc., or based upon a driver's heart rate and respiration rate, and then, if the driver's consciousness lowering or napping is judged, the vehicle is automatically led to and stopped at a safely stoppable site through the determination of the situation around the vehicle, the width of a roadside or a road shoulder, or the position of an obstacle with detection means, such as an on-vehicle camera, a radar sensor, a navigation system and a vehicle-to-vehicle communication. Moreover, the patent document 4 discloses a driving support system for risk avoidance in which a report to a predetermined contact point is made in executing an operation for risk avoidance.

PRIOR TECHNICAL REFERENCES

Patent Documents

[Patent document 1] Japanese Patent Laid-open Publication H06-107031
[Patent document 2] Japanese Patent Laid-open Publication H07-76235
[Patent document 3] Japanese Patent Laid-open Publication 2007-331652
[Patent document 4] Japanese Patent Laid-open Publication 2003-157493
[Patent document 5] Japanese Patent Laid-open Publication 2004-310260

SUMMARY OF INVENTION

Object of the Invention

In an emergency evacuation device, there is conducted the transfer of the right to drive, i.e. the transfer of the authority to drive a vehicle from a driver to a control device at the execution of an automatic vehicle stop control as an emergency evacuation process. Thus, it should be carefully conducted to judge whether or not to execute an automatic vehicle stop control accompanied by the right to drive transfer. Then, in some emergency evacuation devices, as one manner, for example, in order to check if a detection of an abnormality or a deterioration of a driver's condition or a request for an automatic vehicle stop from a driver by himself through a switch or an command input device is not an erroneous detection or input when it is found, there is provided a structure for requesting a driver to input an intention confirmation of a permission, a request or a cancellation of an execution of the automatic vehicle stop control through a switch or an command input device prior to the execution start of the automatic vehicle stop control. In such a process for confirming a driver's intention (intention confirmation process), typically, after the device notifies, by sound and/or by visual indication, a driver of the demand for the input for intention confirmation, the response of the driver to be made (operating a switch or an command input device, or not operating anything to a switch or an command input device) within a predetermined time is waited, and then the driver's intention is confirmed. Accordingly, usually, it takes several seconds to several tens of seconds for the completion of the intention confirmation process before the execution of the automatic vehicle stop control.

By the way, for one of manners of the process in the above-mentioned emergency evacuation device, in a case of the occurrence of an abnormality or a deterioration of a driver's condition during a vehicle stopped before a signal, a road crossing or a railroad crossing, for instance, if it becomes difficult for the driver to keep the depression of a brake pedal, it can be considered preferable to execute a driver support of keeping the vehicle stopped (vehicle stop keeping control). The vehicle stop keeping control is similar to the automatic vehicle stop control with the right to drive transfer because of including the controlling of the motion of a vehicle irrespective of a driver's braking operation. Thus, in executing a vehicle stop keeping control also, it is preferable to conduct an intention confirmation process by a driver prior to the execution start.

However, as already noted, usually, the intention confirmation process by a driver for an emergency evacuation process takes several seconds to several tens of seconds. Thus, if the depression release of a brake pedal or the rotation of a steering wheel, etc. happens against a driver's intention during standing by without starting the execution of the vehicle stop keeping control until the completion of the intention confirmation process, an unintentional motion of the vehicle due to creeping, etc. may occur. In this respect, when a vehicle has stopped before a signal, a road crossing or a railroad crossing (for example, when a signal is red, when a crossing gate bar is descended, or when there exist other vehicle, etc. passing on a crossing lane.), it is anticipated that the driver intends to keep the vehicle stopped. Thus, when the vehicle has stopped before a signal, a road crossing or a railroad crossing, the process keeping the vehicle stopped is, in principle, consistent to the driver's intention so that the intention confirmation process could be omitted. Moreover, when the necessity for the vehicle stop keeping control is detected, ensuring to keep the vehicle stopped by omitting the intention confirmation process will improve the safety of the vehicle unless a driver cancels its necessity by himself, or unless it is not under other conditions where the safety could be much ensured without keeping the vehicle stopped.

Thus, the main object of the present invention, directed to a vehicle's emergency evacuation device which automatically stops a running vehicle or continues the stopped state of a vehicle in a driver's emergency, is to execute a vehicle stop keeping process as an emergency evacuation process without conducting an intention confirmation process for the execution start of the emergency evacuation process, when the emergency evacuation process becomes necessary, such as when an abnormality or a deterioration of a driver's condition occurs, when the driver requests an emergency evacuation process, etc., while the vehicle has been stopped before a signal, a road crossing or a railroad crossing, thereby maintaining the stopped state of the vehicle and ensuring the safety of the vehicle.

In this regard, in this invention, there is proposed an emergency evacuation device including a structure that determines a site for a vehicle stop in accordance with the kind of a road while considering the ease of stopping the vehicle and the traveling safety of a following vehicle during the execution of an automatic vehicle stop control in the running vehicle, and/or a structure that judges whether or not an override to an emergency evacuation process is permitted based on a passenger's motion during the execution of the emergency evacuation process in a running vehicle, thereby taking into account the running safety of the vehicle.

The Means for Solving the Object

According to the present invention, the above-mentioned object is achieved by an emergency evacuation device of a vehicle which executes an emergency evacuation process, comprising an emergency evacuation process execution judgment portion that conducts an intention confirmation process of confirming an intention of a driver for an execution start of the emergency evacuation process when a necessity for the emergency evacuation process arises, and outputs a command of the execution start of the emergency evacuation process when the intention of the driver indicates the execution start of the emergency evacuation process; and a vehicle running control portion that executes the emergency evacuation process in response to the command from the emergency evacuation process execution judgment portion; wherein the device starts an execution of a vehicle stop keeping control as the emergency evacuation process without conducting the intention confirmation process when the necessity for the emergency evacuation process arises in a stopped vehicle. In this regard, a "vehicle stop keeping control" is a control process for keeping a stopped state of a vehicle irrespective of a driver's braking operation (the operation of a brake pedal, etc.). Further, "when a necessity for the emergency evacuation process arises" in the above-mentioned structure is a situation in which it is detected that the continuation of the driving is difficult owing to a reason of an abnormality or a deterioration of a driver's condition, etc., or in which the driver senses so, and thus it is preferable to execute an emergency evacuation process as already noted, i.e., the automatic vehicle stop control that makes a vehicle stopped automatically irrespective of a driver's braking operation, or the vehicle stop keeping control as mentioned above. This "when a necessity for the emergency evacuation process arises", concretely, may be when a driver makes an input indicating a request of the emergency evacuation process to a driver's command input portion, or when a driver's physiological condition estimation portion that estimates a driver's physiological condition detects an abnormality in the driver's physiological condition.

According to the above-mentioned structure, during a vehicle stopped, an execution of the vehicle stop keeping control will be started promptly when a necessity for the emergency evacuation process arises without conducting the time-consuming intention confirmation process. Thereby, the stopped state of the vehicle is maintained irrespective of a driver's braking operation while the creeping or any motion of the vehicle owing to an operation unintended by the driver is prevented, and thus the safety of the vehicle is ensured.

In the above-mentioned structure, more in detail, when a necessity for an emergency evacuation process arises in a condition that the vehicle has been stopped in accordance with a stop sign in a signal or a railroad crossing or in accordance with a road situation, an execution of an emergency evacuation process may be started without conducting an intention confirmation process. As already mentioned, in a case that a signal shows the stop sign (red light), or that a crossing gate has been descended on a railroad crossing, when a vehicle has been stopped according to that stop command, a driver should have the intention of keeping the stopped state. Thus, during a vehicle stopped according to such a stop sign in a signal or a railroad crossing, the omission of an intention confirmation process for the right to drive transfer is consistent to the driver's intention and the emergency evacuation process (the vehicle stop keeping control), and the safety of the vehicle is ensured. In addition, in a case that a vehicle has been stopped, irrespective of a stop sign of a signal or a railroad crossing, in accordance with a road situation, namely, the presences on a road crossing of vehicle, etc. running on a lane crossing across the lane on which the own vehicle is travelling, walkers, obstacles, etc., the driver should have the intention of keeping the stopped state, and therefore, an execution of a vehicle stop keeping control may be started without conducting the intention confirmation process as described above, so that the safety of the vehicle will be ensured. In an embodiment, a stop sign of a signal or a railroad crossing and a road situation are detected with information from a car-navigation system concerning shapes of roads around a vehicle, locations of a road crossing, a railroad crossing and/or a pedestrian crossing; information acquirable through a vehicle-to-vehicle communication, etc. concerning the position and velocity of other vehicle(s) around the own vehicle; an image of a video camera; outputs from circumference recognizing sensors, etc. (a radar sensor, a millimeter wave sensor, etc.), and when a necessity for an emergency evacuation process arises, an execution of a vehicle stop keeping control may be started without conducting an intention confirmation process, except when keeping the vehicle stopped deteriorates the safety. On the other hand, even during a vehicle stopped, if keeping the vehicle stopped can decrease the safety, depending upon the road situation or the condition of the sign of a signal or a railroad crossing, an execution of a vehicle stop keeping control may be started after conducting a driver's intention confirmation process.

As already described, the above-mentioned inventive device may execute an automatic vehicle stop control when a necessity for an emergency evacuation process arises during running a vehicle (after conducting an intention confirmation process). In the automatic vehicle stop control, a vehicle is decelerated and stopped at a safely stoppable site determined with information from a car-navigation system concerning shapes of road around the vehicle, locations of a road crossing, a railroad crossing and/or a pedestrian crossing; information acquirable through a vehicle-to-vehicle communication, etc. concerning the position and velocity of other vehicle(s) around the own vehicle; an image of a video camera; outputs from circumference recognizing sensors, etc. In this regard, for such a safely stoppable site, typically, a roadside of the road on which a vehicle is running is anticipated, taking into account the possibility for a following vehicle to pass through, and for this, the detection of a roadside is required. However, depending upon running situations of the vehicle, there is a case that the site for the stop may not necessarily be set to a roadside. For instance, on a driveway or a highway, a lane width and a road shoulder are wide and there are no obstructions, such as a curbstone, while there are provided work pieces, such as a wall and a fence, in both sides of the road, and therefore, even when the own vehicle stops within a lane rather than a roadside, a following vehicle can avoid and pass by the stopped own vehicle (see FIG. 4 (A)). On the other hand, in a normal road, a lane and a road shoulder are relatively narrow, and, in many cases, a foot walk, a curbstone, a slot, etc. are made on the roadside, and therefore, sometimes, it is not preferable to stop the own vehicle on a roadside (see FIG. 4 (B)). In that case, rather, it is much safer to notify a following vehicle of the own vehicle's stop with a request to the following vehicle for stopping together with the own vehicle.

Thus, the above-mentioned inventive device may be designed such that, in executing an automatic vehicle stop control in a running vehicle as an emergency evacuation process, for the vehicle running on a lane of a driveway or a highway, a travel path of the vehicle is controlled so that the stop site in the automatic vehicle stop control will be adjacent to the edge of the lane on which the vehicle is running closer to the opposite lane thereto, and for the vehicle running on a lane of a normal road, a travel path of the vehicle is controlled so that the stop site in the automatic vehicle stop control will not be adjoined to either edges of the lane on which the vehicle is running. According to this structure, in the execution of the automatic vehicle stop control, the detection of a road edge becomes unnecessary, and the safety of the vehicle will also be ensured. In this regard, in the above-mentioned structure, the reason that the stop site is rendered to be adjacent to the edge of the lane on which the vehicle is running closer to the opposite lane thereto during running on a driveway or a highway is that it is safer for a following vehicle to run while avoiding the own vehicle through a position far away from an approaching vehicle on the opposite lane. In addition, for a vehicle running the lane of a driveway or a highway, when a road shoulder on which the vehicle can stop is detected, the travel path of the vehicle may be controlled so that the stop site in the automatic vehicle stop control will become in the road shoulder.

By the way, in the above-mentioned vehicle's emergency evacuation device, once the execution of an emergency evacuation process is started, preferably, the override, namely, a process in which a displacement of an accelerator pedal, a brake pedal, a steering wheel, etc. overwhelms the emergency evacuation process to change the running condition of the vehicle, is in principle invalidated. This is because there is the possibility that a displacement in an accelerator pedal, a brake pedal, a steering wheel, etc. unintended by the driver occurs owing to a driver's seizure, rigor of hand and foot, etc. Thus, in the above-mentioned vehicle's emergency evacuation device, preferably, there is provided a cancel command input portion (cancel switch) which receives a driver's command of canceling the execution of emergency evacuation process, and the override to the emergency evacuation process is permitted when the driver inputs a cancel command through the cancel command input portion. And desirably, in order to prevent an erroneous operation by persons other than the driver, the stop command input portion is provided at a site easily accessible only for a driver.

However, assuming a case that the person sitting on the passenger seat operates a steering wheel, etc. in order to handle a sudden situation change, e.g. the quick braking of a preceding vehicle, it may be more preferable in such a situation to permit the override even without a cancel command to the cancel command input portion. Such a situation can be detected based on for example, the posture of a passenger of the vehicle.

Then, in the inventive device, further, after the execution start of an emergency evacuation process, it may determined whether or not to permit an override to the emergency evacuation process based on the posture of a passenger of a vehicle, irrespective of a presence or an absence of an acceptance of the cancelling command. In that case, concretely, when a displacement of an accelerator pedal, a brake pedal, a steering wheel, etc. arises after the execution start of an emergency evacuation process, whether or not this displacement is judged valid is determined in accordance with the posture condition of a passenger of a vehicle, and when the displacement is judged valid, the running condition of the vehicle will change according to the displacement.

Effect of Invention

Generally, according to the present invention described above, in a vehicle's emergency evacuation device which executes an automatic vehicle stop control or a vehicle stop keeping control in a driver's emergency, the control process execution for the judgment of whether to execute an emergency evacuation process, the selection of the stop site in the emergency evacuation process and/or the permission/disapproval of the override to the emergency evacuation process can be made more appropriate to a situation where an emergency evacuation process becomes required. As explained above and in the column of embodiments, the situations at the time of the necessity for an emergency evacuation process arising differ variously and mutually. Then, in the series of the manners of the above-mentioned inventive device, through examining more in detail situations anticipated during the driving of a vehicle, the same control process is not always executed in all cases, but different processes are executed depending upon situations, and thereby the further improvement in the vehicle's safety in an emergency evacuation process is expected as compared with the structures of the conventionally proposed vehicle's emergency evacuation devices.

The other purposes and advantages of the present inventions will become clear by explanation of the following preferable embodiments of the present inventions.

BRIEF EXPLANATION OF THE DRAWINGS

FIGS. 1 (B) and (C) are schematic diagrams of examples of the arrangement of a cancel switch 80a.

FIG. 2 (A) shows in the form of a flow chart an embodiment of process for the judgment of an execution start of an automatic vehicle stop control executed in a judgment processing portion of an emergency evacuation device in accordance with the present invention. FIGS. 2 (B) and (C) each show an example of an intention confirmation process of step 40 in FIG. 2 (A) in the form of a flow chart.

FIG. 4 (B) shows an example of a stop site for a vehicle running on a normal road in an automatic vehicle stop control of an emergency evacuation device in accordance with the present invention. FIG. 4 (C) shows a relation between the distance and vehicle speed from a control start to a vehicle stop, which explains about the setting of the deceleration in stopping a vehicle in an automatic vehicle stop control.

FIG. 5 (C) shows examples of changes of parameters seen in the detection of an action of a person sitting on the passenger seat who tries to help the driving.

EXPLANATIONS OF REFERENCE NUMERALS

O—Own vehicle
F—Following vehicle
C—Vehicle running on a crossing lane
S—Signal
L—Stop line
W—Wall, etc.
RS—Road shoulder
RE—Roadside
CL—Central division line
op—Vehicle approaching from the front
42L, R—Seat surface sensor of a passenger seat
[The Best Mode for Invention]

In the followings, the present invention is explained in detail about some preferable embodiments, referring to the attached drawings.

The vehicle's emergency evacuation device in accordance with the present invention, briefly speaking, is a device that automatically executes a process which brings and stops a vehicle adjacent to a roadside, a lane edge, etc. so as not to involve the circumferences in accordance with the detecting of a necessity of the automatic vehicle stop or a driver's request, when it becomes difficult for a driver to continue driving the vehicle due to a sudden illness or an indisposition during the driving of the vehicle (an emergency evacuation process by an automatic vehicle stop control). Further, the vehicle's emergency evacuation device automatically executes a process which, during a vehicle stopped, keeps the vehicle in the stop state irrespective of an operation of a driver, such as depressing a brake pedal, in accordance with the detecting of its necessity or a driver's request, when it becomes difficult for a driver to continue driving the vehicle due to a sudden illness or an indisposition (an emergency evacuation process by a vehicle stop keeping control). Especially in the present invention, as explained in detail later, when an emergency evacuation process is needed during a vehicle stopped, the emergency evacuation process is executed without conducting a process for confirming a driver's intention to the emergency evacuation process under predetermined conditions. Hereafter, the structure and operation of the inventive emergency evacuation device are explained in detail.

(a) General Structure

A vehicle on which the vehicle's emergency evacuation device is installed may be an arbitrary vehicle, such as an automobile. On the vehicle, there are installed in usual manners a powering device that generates a braking-driving force in each wheel, a steering device, and a braking device which generates a braking force in each wheel (not shown). The powering device, braking device and steering device each may be designed to be operated by a control device (a driving control device, a braking control device, a steering control device) that changes and controls a braking-driving force or a steering angle in accordance with a command from a running control portion aside from an operation input by a driver.

Figure 1A:
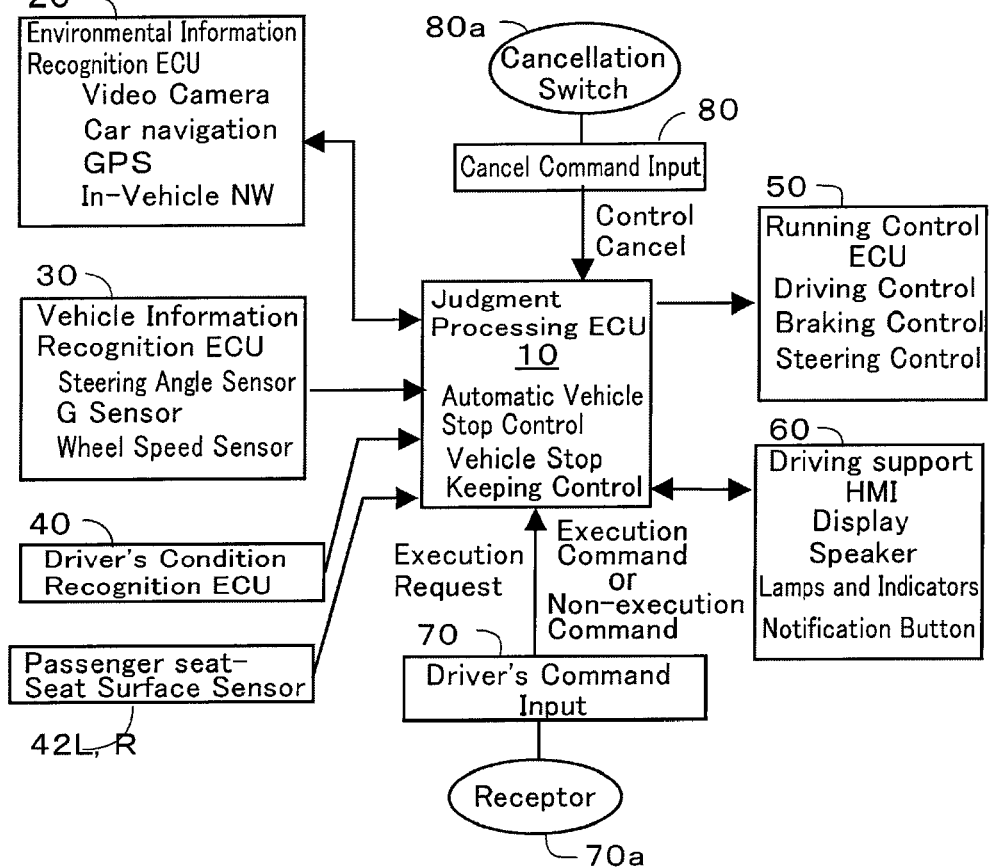
FIG. 1 (A) shows in the form of a block diagram a system configuration which consists of an emergency evacuation device of a vehicle in accordance with the present invention and a group of devices related thereto.
Figure 1B:
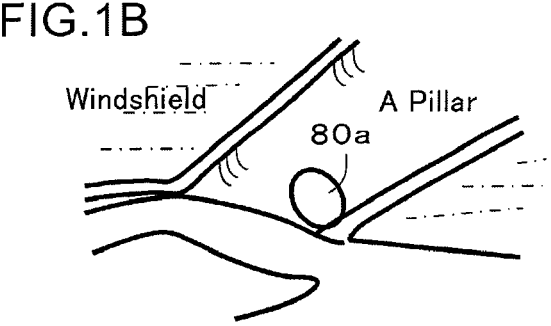
Figure 1C:
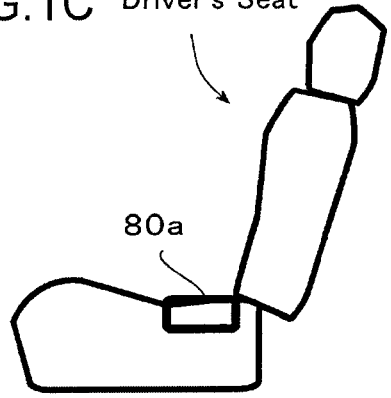

FIG. 1 (A) shows in the form of a block diagram a system configuration of the vehicle's emergency evacuation device and devices involved therewith. Referring to this drawing, when a driver condition recognition portion 40 (driver's condition recognition ECU) for monitoring the condition of a driver, such as a deterioration of the body condition and the presence or absence of a consciousness lowering, detects an abnormality or a deterioration of the driver's condition and judges the necessity for an emergency evacuation process, or when the driver requests an emergency evacuation process through a receptor 70a (switch, etc.) of a driver's command input portion 70, in order for a running vehicle to stop at a safely stoppable site and in order for a stopped vehicle to maintain its stop state, the main body 10 (Judgment processing ECU) of the vehicle's emergency evacuation device, using information or data from an environmental information recognition portion 20 (environmental information recognition ECU) for detecting conditions around a vehicle and a vehicle information recognition portion 30 (vehicle information recognition portion ECU) for detecting running conditions of the vehicle, gives a command to a running control portion 50 (running control ECU) conducting the braking-driving control and steering control of the vehicle. In addition, together with the transmission of the command, the emergency evacuation device 10 operates various driving support HMI (Human Interface) 60 to conduct various notices for letting the driver, the passengers or the other vehicle around the own vehicle recognize the presence of the necessity or execution of an emergency evacuation control process.

Regarding such a emergency evacuation process, as already noted, an automatic vehicle stop control or a vehicle stop keeping control as described above includes the process of transferring the right to drive a vehicle from a driver to an electronic control device, and therefore, principally, the judgment of whether to execute such an emergency evacuation process should be carefully done, after carrying out a driver's intention confirmation. Thus, in the above-mentioned structure, when an emergency evacuation process is judged necessary or when an emergency evacuation process is requested by the driver, basically, the judgment processing ECU uses an indication on a display or a sound from a speaker of the driving support HMI to request the driver to give the receptor 70a of the driver's command input portion 70 an command input for the permission or the reconfirmation of the request (the command for execution) or the cancelling (the command for non-execution) of the execution of the emergency evacuation process (Intention confirmation process). Then, in accordance with the driver's response to the intention confirmation process, in the manner explained in detail later, the judgment of whether or not to execute an emergency evacuation process is made, and when the execution of an emergency evacuation process is determined, an automatic vehicle stop control or a vehicle stop keeping control is executed.

However, especially when a vehicle has been already stopped in accordance with the stop sign of a signal or a railroad crossing or a road situation, usually, the driver should have an intention of keeping the vehicle stopped, and thus, it is anticipated that the above-mentioned intention confirmation process can be omitted. Moreover, the intention confirmation process takes several seconds to several tens of seconds by its completion, while there is the possibility that the vehicle could move owing to the creep phenomenon or the displacement of a pedal or a steering wheel not intended by the driver until the completion of the intention confirmation process. Therefore, in the inventive device, as explained later, the intention confirmation process is omitted under predetermined conditions when a necessity for an emergency evacuation process arises, namely, when the driver condition recognition portion 40 detects an abnormality or a deterioration of the driver's condition or when the driver requests an emergency evacuation process, during the vehicle stopped.

Furthermore, in the above-mentioned inventive device, after the execution start of the automatic vehicle stop control or the vehicle stop keeping control as the emergency evacuation process, principally, an operation to an accelerator pedal, a brake pedal, a steering wheel, etc. namely, a displacement of these instruments is invalidated so as not to be reflected in the motion of the vehicle. This is because any displacement of the accelerator pedal, brake pedal, steering wheel, etc., not intended by a driver's intention, might occur due to a driver's seizure, rigor of hand and foot, etc., and such displacements should be ignored. However, after the execution start of the emergency evacuation process, there may occur a situation that the driver or the passenger wishes to perform an override, namely, operating the accelerator pedal, brake pedal, steering wheel, etc., to control the motion of the vehicle while overwhelming the automatic control by the emergency evacuation device. Thus, in the device of this embodiment, an override is validated after a cancel switch 80a of a cancel command input portion 80 is operated and thereby the command of the cancel of the control is given from the stop command input portion 80 to the judgment processing ECU 10. And, in order to prevent a person other than the driver from operating the cancel switch 80a, preferably, it is mounted on a position accessible easily only for the driver, e.g. the root of the pillar of the driver side (FIG. 1 (B)), the vicinity of the junction of the back portion and hip portion of the driver's seat (FIG. 1 (C)) or the sun visor of the driver's seat (not shown).

However, when a sudden situation change, e.g. the quick braking of a preceding vehicle, occurs, it is possible that the person sitting on the passenger seat can handle the sudden situation change by operating the pedal and steering wheel although the driver is difficult to operate. In such a case, it is advantageous to validate an override irrespective of the operation of the cancel switch 80a. Thus, in the inventive device, as explained in detail later, in order to detect the condition (especially the posture) of the person sitting on the passenger seat, a sensor 42 is provided on the seat surface of the passenger seat, and the output of the sensor 42 is seen in the judgment of permission/disapproval of an override.

Each of the above-mentioned ECUs may include a microcomputer of a usual form having CPU, ROM, RAM and input/output port apparatus, and a drive circuit, mutually connected with bidirectional common bus. The processing operations in the respective ECUs explained below are realized by the operation according to computer programs of the respective ECUs.

(b) Driver's Condition Recognition Portion (Driver's Physiological Condition Estimation Portion)

As noted above, the driver's condition recognition portion monitors a body condition of a driver during driving a vehicle, and detects a deterioration of the body condition or a consciousness lowering of the driver. The driver's condition recognition portion may be similar to an arbitrary device which detects, for instance, an electroencephalogram, a heart rate, a sweat rate, a blood pressure and components in expiration of the driver, to detect how the condition of the driver's body is based on the detected information. In addition, in the monitoring of the driver's body condition, the visual axis, the change of the face direction, etc. of the driver may be taken into account by using a camera capturing the face and posture of the driver. Then, if an abnormality or a deterioration in the driver's condition at a level which will make the continuation of the driving difficult is detected in the driver's condition recognition portion, this information is transmitted to the judgment processing ECU.

(c) Process for Judging the Execution Start of an Emergency Evacuation Process

The judgment of whether or not an execution of the emergency evacuation process is to be started is made with reference to the presence or absence of a request from the driver and the driver's body condition. Further, especially in the present invention, as already described, during the vehicle stopped, the road situation is seen, also. FIG. 2 (A) shows a process for the judgment of whether or not to start an execution of the emergency evacuation process executed in the judgment processing ECU. In this regard, the process in this drawing is executed repeatedly during driving a vehicle according to a computer program saved in a memory of the judgment processing ECU.

Referring to FIG. 2 (A), in the judgment process for whether or not to start an execution of the emergency evacuation process, first, there are judged whether or not the driver requests the emergency evacuation process through the receptor of the driver's command input portion 70 (step 10) and whether or not the result monitored by the driver's condition recognition ECU 40 indicates a deterioration of the driver's physiological condition (step 20). Then, when the driver requests the emergency evacuation process or the detection of an abnormality or a deterioration of the driver's condition is indicated, it is judged if a vehicle has been stopped (step 30). The judgment may be made by checking if whether or not the vehicle speed is >0.

When the vehicle has not been stopped, namely, when the vehicle is running, an automatic vehicle stop control is executed as an emergency evacuation process. However, before the execution of the emergency evacuation process, a process for confirming the driver's intention about whether the execution of an emergency evacuation process may be started is executed (step 40). In one manner of the intention confirmation process, as shown in FIG. 2 (B), first, by means of a sound from a speaker or an indication on a display, the driver is requested to conduct, as an intention confirmation process for the right-to-drive transfer, an operation for permitting the execution start of the emergency evacuation process, such as by pushing or operating the receptor 70a when permitting the execution start of the emergency evacuation process (step 100). Then, when it is judged that the driver has conducted in a predetermined time the operation for the permission (steps 110 and 120) in response to the above-mentioned request, the presence of the intention of the execution of the emergency evacuation process is judged. However, when the predetermined time passes before judging that the driver conducts the permission operation, the absence of the intention of the execution of the emergency evacuation process is judged. In another manner of the intention confirmation process, as shown in FIG. 2 (C), by means of a sound from a speaker or an indication on a display, the driver is requested to conduct, as an intention confirmation process for the right-to-drive transfer, an operation for cancelling the execution start of the emergency evacuation process, such as by pushing or operating the receptor 70*a* when cancelling the execution start of the emergency evacuation process (step 200). Then, when it is judged that the driver has conducted in a predetermined time the operation for the cancellation in response to the above-mentioned request (steps 210 and 220), the absence of the intention of the execution of the emergency evacuation process is judged. However, when the predetermined time passes before judging that the driver conducts the cancellation operation, the presence of the intention of the execution of the emergency evacuation process is judged. Which of the process of FIG. 2 (B) and the process of FIG. 2 (C) is employed as the intention confirmation process may be chosen arbitrarily. However, in a case that the degree of a deterioration of the driver's condition is detectable, typically, the process of FIG. 2 (B) may be chosen when the degree of the deterioration is low, and the process of FIG. 2 (C) may be chosen when the degree of the deterioration is high.

Then, after conducting the intention confirmation process, when the presence of the execution of the emergency evacuation process has been judged (step 42), the automatic vehicle stop control is executed as the emergency evacuation process (step 60). On the other hand, when the absence of the execution of the emergency evacuation process has been judged (step 42), no emergency evacuation process is executed (step 70), and the judgment processes in steps 10 and 20 are resumed.

In step 30, when it is judged that the vehicle has been stopped, it is judged whether or not the stopped state should be kept with reference to the road situation (step 50). Briefly, in this judgment of the road situation, the condition of a signal or a railroad crossing or a traffic regulation (whether a temporary stop is required or not, etc.), the traffic prediction around the stop site or the presence or absence of a following vehicle, etc. may be seen by means of a car-navigation system, a vehicle-to-vehicle communication, a video camera image or outputs of circumference recognition sensors (a radar sensor, a millimeter wave sensor, etc.) etc. in the environmental information recognition portion 20.

Figure 3:
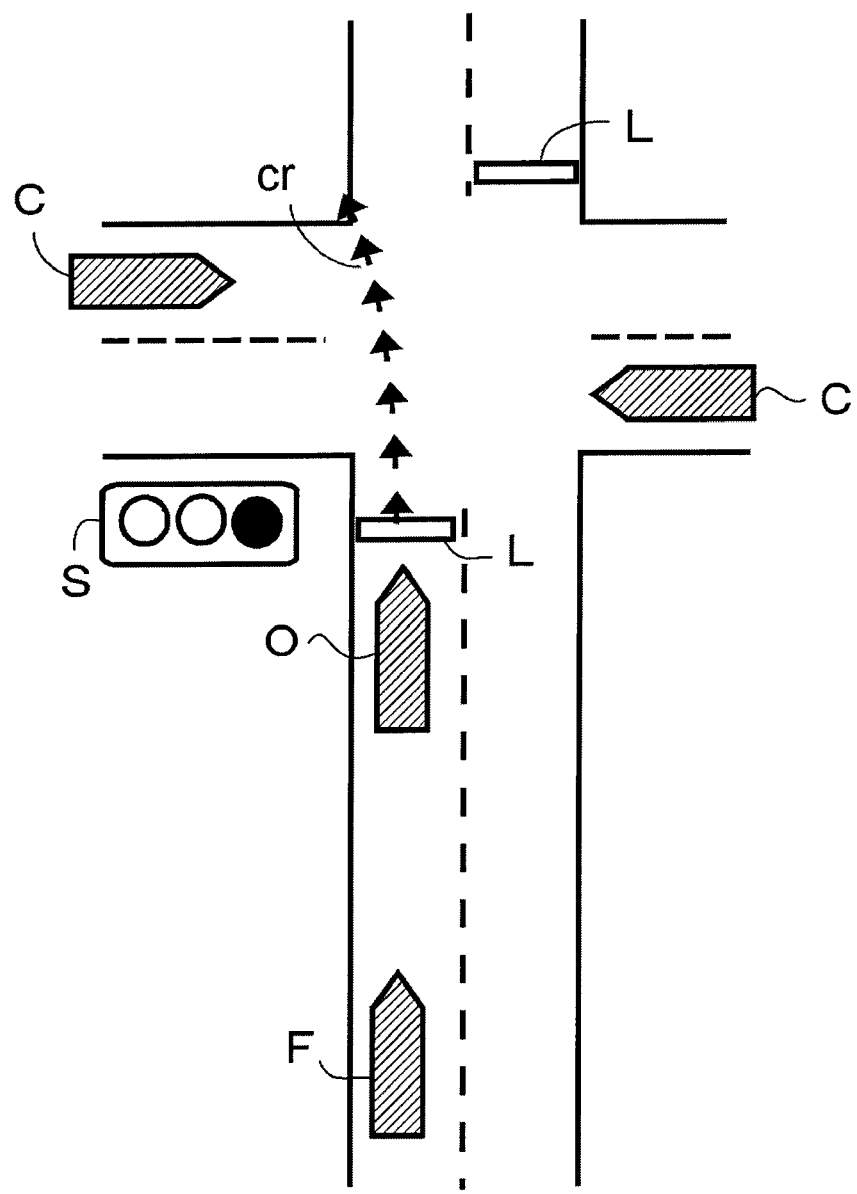
FIG. 3 shows an example of a road situation where the intention confirmation process is omitted.

For example, as illustrated in FIG. 3, assuming that the own vehicle O has been stopped at the stop line L of a road crossing of which the signal S shows the stop sign (red light) (or a road crossing which has no signal but a road sign for temporary stop), it can be anticipated that the other vehicle C is passing on the crossing road. Also, at a railroad crossing indicating the stop sign or whose gate bar has been descended, it can be anticipated that a railway vehicle is passing in the direction intersecting with the travelling direction of the own vehicle. Thus, firstly, it is judged that the stopped state should be kept when any of (i) a case that the signal in front of the stop site shows the stop sign; (ii) a case that the railroad crossing in front of the stop site shows the stop sign; and (iii) a case that the stop site is a temporary stop site is detected by means of the information from the environmental information recognition portion 20. Moreover, especially, in front of the stopped own vehicle, when the stop sign of the signal changes to an enabling signal (green light) or when the gate bar of the railroad crossing goes up and the stop sign is turned off, the traffic is resumed in the travelling direction of the own vehicle, and in that case, if a following vehicle F (see FIG. 3) exists behind the own vehicle, it is possible that the stopped state should not be kept. Thus, in a case that a necessity for the emergency evacuation process is detected after the stop sign of the signal or the railroad crossing is turned off during the vehicle stopped, the presence or absence of a following vehicle and its distance may be seen in the judgment of whether or not the stopped state should be kept. Concretely, by means of various devices in the environmental information recognition portion 20, the distance to a following vehicle is detected, and it may be judged that the stopped state may be kept if the distance is longer than a predetermined distance (condition (iv)) since it is considered that the keeping of the stopped state is not or rarely obstructive for the following vehicle.

Furthermore, when there are neither signal, nor railroad crossing, nor road sign of temporary stop, etc. in front of the stop site so that the information of (i)-(iii) as mentioned above is not available, there may be seen the presence or absence of a dead angle in front of the stop site of the own vehicle, an encounter probability with an object in front of the stop site and/or an existence probability of a flow line in front of the stop site. In this connection, the presence or absence of a dead angle is detectable using the information from the environmental information recognition portion 20. The encounter probability with an object is the probability of the number of times of encountering a vehicle, a pedestrian, etc., in passing through an arbitrary site so far (see patent document 5), and the existence probability of a flow line is the probability that an arbitrary position is a position through which a vehicle, a pedestrian, etc. passes. The respective probabilities are acquirable from the data previously stored in an arbitrary storage device. Then, it may be judged that the stopped state should be kept on the stop site, (v) when a dead angle exists, (vi) when the encounter probability with an object is beyond a predetermined value, or (vii) when the existence probability of a flow line is beyond a predetermined value.

Thus, when the condition (i)-(vii) as described above is detected, the stopped state should be kept and it is predicted that the vehicle stop keeping control is not contradictory to the driver's intention, and accordingly, while it is judged that the intention confirmation process is omissible (step 52), the vehicle stop keeping process is executed as the emergency evacuation process (step 60). On the other hand, when none of the conditions (i)-(vii) is detected, it is judged that the intention confirmation process is not omissible (step 52), and thus, after the intention confirmation process (step 40) described above is conducted, the vehicle stop keeping process is executed as the emergency evacuation process (step 60) only when it is judged that the intention of execution of an emergency evacuation process exists.

According to the above-mentioned structure, when it is judged that a vehicle has been stopped and the stopped state should be kept in accordance with the road situations, the driver's intention confirmation process to the emergency evacuation process is omitted, and thus, after the necessity for the emergency evacuation process arises, the vehicle stop keeping control will be executed immediately. Thereby, in an emergency, such as when a driver's condition deteriorates during a vehicle stopped, the vehicle will keep the stopped state even if the driver performs the releasing of a brake pedal or the rotating of a steering wheel, so that the safety of the vehicle will be ensured.

(d) The Stop Site in the Automatic Vehicle Stop Control

As described above, in a running vehicle, the automatic vehicle stop control is executed as the emergency evacuation process. In the automatic vehicle stop control, briefly, after determination of an execution start of the control, a vehicle is decelerated and also brought to a safely stoppable site which is selected or determined, taking into account the circumferential situation acquired from the environmental information recognition portion 20. In the determination of a safely stoppable site, a region where the influence of the slowdown and stopping of the own vehicle on the circumference can be made as small as possible is grasped, using information from a car-navigation system about the shapes of the roads or the position of a road crossing, a railroad crossing or a pedestrian crossing around the vehicle, information acquirable by a vehicle-to-vehicle communication, etc. about the position and velocity of other vehicle(s) around the own vehicle, information detectable with a video camera image, the outputs of a circumference recognition sensors (a radar sensor, a millimeter wave sensor, etc.), etc. about the position and distance of a roadside or a road shoulder, the position and distance of an obstacle or the position of white line on road surface, and then, within the region, there is selected a site at which the own vehicle can be stopped without difficulty by decelerating and steering the vehicle from the current running conditions (a vehicle speed, an acceleration and a deceleration, a steering angle) acquired in the vehicle information recognition portion ECU.

Regarding the selection of the stop site in this automatic vehicle stop control, in one of the ways, first, there can be considered a structure that detects a roadside of a road on which a vehicle is running by means of the information from the environmental information recognition portion 20, and subsequently, determines as a target stop site a roadside region achievable by deceleration and/or steering without difficulty from the current vehicle running condition. However, in the emergency stopping of a running vehicle, for rendering the influence on the circumferences to be as small as possible while considering the safety of the own vehicle, it is not always required to choose a roadside as the stop site. Namely, in a case of running on a road, such as a driveway, a highway, etc., which has many lanes of wide width with a roadside having no curbstone, etc. but a work piece, such as a wall, even if the own vehicle is stopped in a lane instead of making the vehicle move to a roadside, a following vehicle can avoid the stopped own vehicle. Further, as drawn in FIG. 4 (B), in a case of running on a road such as a normal road, having a narrow lane and/or a narrow road shoulder with a roadside having a curbstone, a ditch, etc., even if the own vehicle is stopped in the roadside temporarily, it is possible that the following vehicle has to go into the opposite lane, and also, in bringing the own vehicle close to the roadside, it is necessary to very precisely control the distance between a curbstone or a ditch and the own vehicle in order to avoid the collision to the curbstone and the falling into the ditch. Thus, in such a case, it is safer for the following vehicle to also stop in the emergency stop of the own vehicle. Then, in the inventive device, in the selection of a stop site in the automatic vehicle stop control, it is distinguished whether the road on which a vehicle is running is a driveway or a highway or a normal road, and the stop site is determined in different manners in the respective cases.

Concretely, in the process of FIG. 2 (A), after determining the execution start of the emergency evacuation process during running a vehicle, whether the road on which the vehicle is running is a driveway or a highway, or a normal road is judged using information from the environmental information recognition portion 20. When the road on which the vehicle is running is a driveway or a highway, the white line wl of the lane on which the own vehicle O is running is detected with a camera and a system for white line detection (LKA (lane keeping assist system), etc. may be used.), and, as schematically drawn in FIG. 4 (A), a stop site is determined along the white line wl of the side near the opposite lane op. Then, when the own vehicle O stops, the following vehicle F will run as shown by the arrow a, while avoiding the own vehicle O through the side of the own vehicle O away from the opposite lane without moving into the opposite lane. In this regard, when the own vehicle is running on the lane adjacent to the central division line CL, the stop site may be determined along the white line wl of the side away from the opposite lane. In this case, since the side of the own vehicle O away from the opposite lane is wide, the following vehicle F can run while avoiding the own vehicle O through the side of the own vehicle O away from the opposite lane. Moreover, when it is detected in the roadside RE that the road shoulder RS between a work piece, such as the wall W, and the roadside RE has a width stoppable by the own vehicle, the stop site O' may be determined within the road shoulder RS.

Figure 4A:
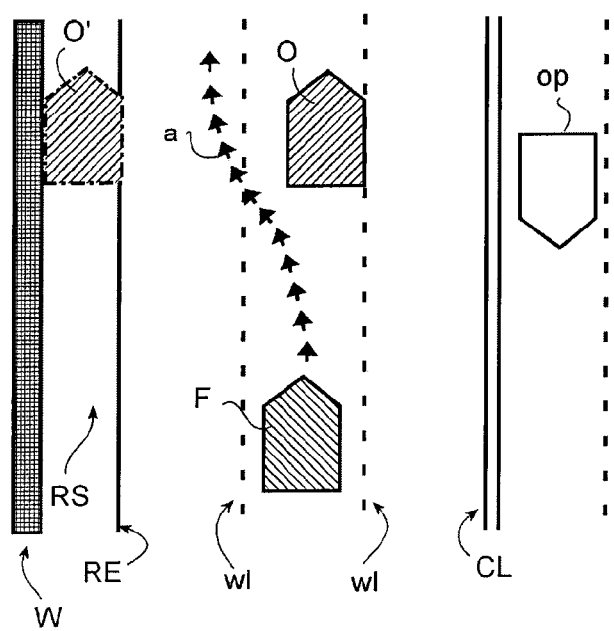
FIG. 4 (A) shows an example of a stop site for a vehicle running on a driveway or a highway in an automatic vehicle stop control of an emergency evacuation device in accordance with the present invention.
Figure 4B:
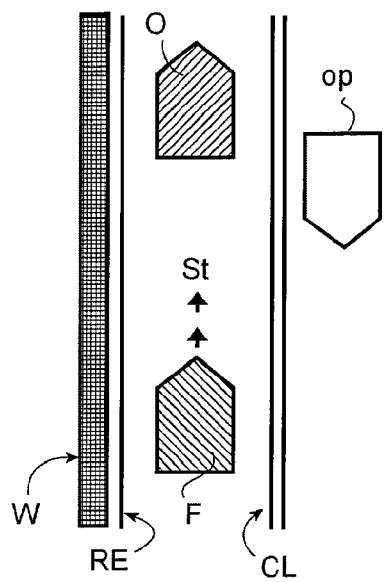
Figure 4C:
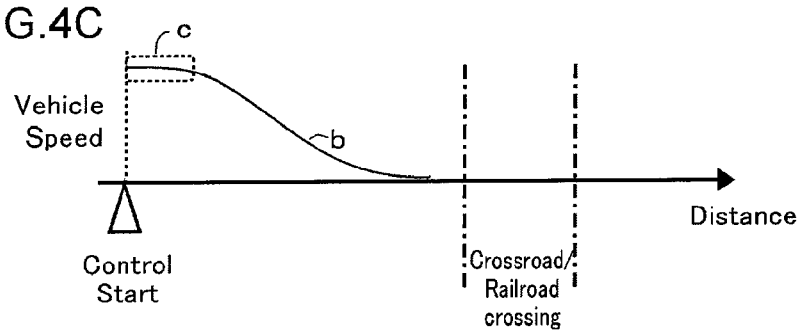

On the other hand, when the road on which a vehicle is running is a normal road, in order to eliminate the necessity of controlling with high precision the distance between the own vehicle and roadside, the own vehicle is stopped without approaching either of a roadside RE and central division line CL as schematically drawn in FIG. 4 (B). In this case, it is not preferable that a following vehicle F bypasses the own vehicle O because the former would enter into the opposite lane, and therefore, in order for the following vehicle F also to surely stop, it is preferable to notify the following vehicle F that the own vehicle O will stop e.g. by turning on a hazard indicator, etc. In this connection, in a case of stopping a vehicle on a normal road as described above, the deceleration of the vehicle is set such that the vehicle velocity will surely decrease to 0 just before a road crossing or a railroad crossing as illustrated with b in FIG. 4 (C). In addition, in that time, in order to prevent the rear-end collision of a following vehicle, the increase in the deceleration after the control start should be as slow as possible as illustrated with c in FIG. 4 (C) so that the following vehicle and other circumference can be surely informed of the stopping of the own vehicle.

For the other concrete manners of the control processes in the automatic vehicle stop control, for example, the patent document 3 or the description in PCT/JP2011/052289 by the inventor of the present application may be referred to.

Thus, according to the above-mentioned structure, in executing the automatic vehicle stop control as the emergency evacuation process, a stop site is selected more appropriately depending upon the kind of the road on which a vehicle is running, and then, the travel path to the stop site will be controlled. Also in this structure, since the detection of a roadside is not an indispensable process, a device capable of detecting a roadside with high precision is not absolutely needed, so that it is advantageous because the manufacturing cost of a vehicle can also be reduced.

(e) Override after an Emergency Evacuation Process Execution Start

As noted, after the execution start of an emergency evacuation process, in principle, an override becomes valid after the cancel switch 80*a*, provided at a position easily accessible for a driver, of the stop command input portion 80 is operated and the command of cancelling the control is given from the cancel command input portion 80 to the judgment processing ECU 10. However, for example, in a case that a sudden change of the situation, such as quick braking of a preceding vehicle, is likely to occur, it is more advantageous to permit an override even without operating the cancel switch 80*a* when a person sitting on the passenger seat tries a certain operation. Thus, in the inventive device, with reference to the posture of a riding person, an override is validated irrespective of the presence or absence of an operation of the cancel switch 80*a* when the possibility that the passenger makes a suitable motion for an override is detected.

Figure 5A:
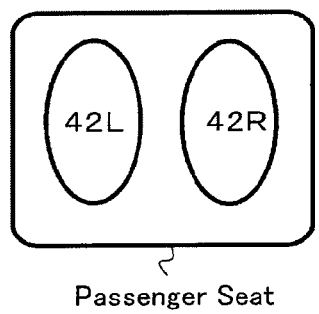
FIG. 5 (A) is a schematic plan view of a seat surface sensor of a passenger seat seen in the determination of whether or not to permit an override after an execution start of an emergency evacuation process in an emergency evacuation device in accordance with the present invention, and FIG. 5 (B) is a drawing showing a condition of the seat surface sensor when a person sitting on the passenger seat leans its posture toward the driver side.
Figure 5B:
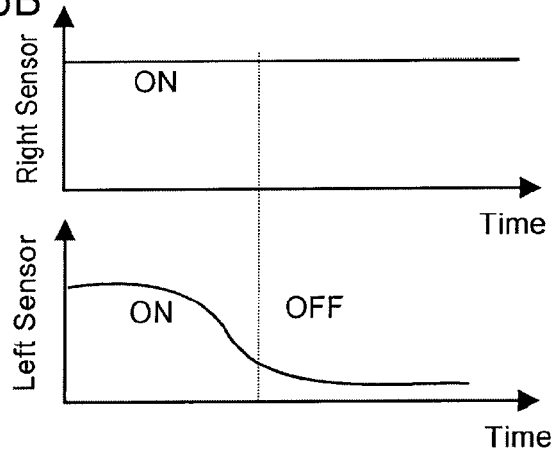
Figure 5C:
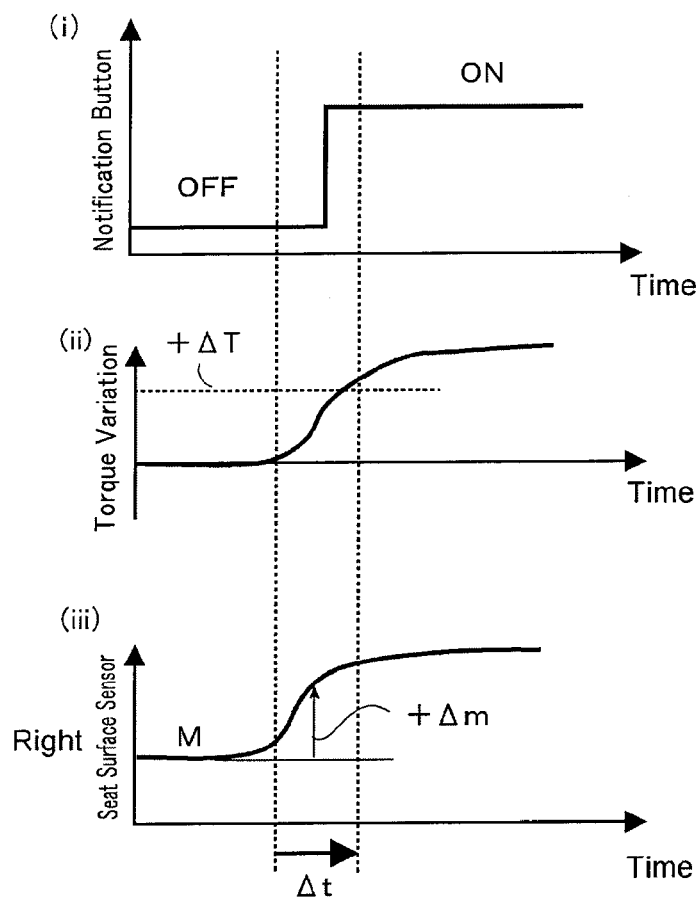

In order to attain the above-mentioned structure, as already noted, seat surface sensors 42L, R detecting the left and right loads of the passenger are provided on the seat portion of the passenger seat, as illustrated in FIG. 5(A). Thus, after the execution start of an emergency evacuation process, the outputs of these seat surface sensors 42L, R are monitored, and as illustrated in FIG. 5(B), when the load of the sensor 42L of the window side (left-hand side) is decreased to or less than a predetermined value (when the sensor turns to OFF state), it is detected that the person sitting on the passenger seat leans its posture to the driver side. Then, if the performing of a certain operation is detected within a predetermined time Δt after the detection of the change of the person's posture, it is estimated that the person sitting on the passenger seat has tried an override, and the subsequent overrides will be permitted. Here, the certain operation may be, for example, any of the followings:

(i) A notification button which generates an emergency signal for the outside of the vehicle has been pushed (see FIG. 5(C) (i));
(ii) The steering wheel has been operated and the variation of a steering torque has exceeded beyond a predetermined value ΔT (see FIG. 5(C) (ii));
(iii) The person sitting on the passenger seat has exerted a load to the driver seat side (the right-hand side) for checking the driver's consciousness condition (see FIG. 5(C) (iii))

The above-mentioned predetermined time Δt may be set arbitrarily, e.g. experimentally, and the predetermined time Δt may also be changed according to the situation detected in front of the own vehicle. Concretely, using information from the environmental information recognition portion 20, it is judged (a) that the present position is close to a road crossing, a converging point, a splitting point, an exit, etc., or (b) that the preceding vehicle starts lighting a hazard indicator or a winker, and, when (a) is detected, the predetermined time Δt may be set to be shorter than when (b) is detected. In addition, the predetermined time Δt may be changed according to whether or not the content of any of the above-mentioned operations of the person sitting on the passenger seat is suitable for the situation. For instance, when there is an operation to either of the steering wheel, brake pedal and shift lever, it is considered that the operation of the steering wheel is more appropriate than the operation of the brake pedal, and that the operation of the brake pedal is more appropriate than the operation of the shift lever. Thus, the predetermined time Δt when there is an operation of the steering wheel may be set shorter than when there is an operation of the brake pedal, and the predetermined time Δt when there is an operation of the brake pedal may be set shorter than when there is an operation of the shift lever.

Thus, under the condition that an override is permitted, the operations to the accelerator pedal, brake pedal, steering wheel, etc. becomes valid, and a control demand corresponding to a displacement in these instruments, overwhelming control demands by the automatic vehicle stop control or vehicle stop keeping control, is referred to in the running control ECU, and thereby the respective parts in the vehicle will be controlled.

According to the above-mentioned structure, after the execution start of an emergency evacuation process, a sudden operation of the person sitting on the passenger seat to a steering wheel, etc. at the occurrence of a situation change, such as a quick braking of a preceding vehicle, is permitted as an override to the emergency evacuation process.

Although the above explanations have been made with respect to embodiments of the present invention, it will be apparent for those skilled in the art that various modifications and changes are possible, and that the present invention is not limited to the above-illustrated embodiments and may be applied to various devices and apparatus without deviating from the concepts of the present invention.

The invention claimed is:

1. An emergency evacuation device of a vehicle that executes an emergency evacuation process of either of an automatic vehicle stop control and a vehicle stop keeping control, comprising:
an emergency evacuation process execution judgment portion which is programmed to conduct an intention confirmation process of confirming an intention of a driver for an execution start of the emergency evacuation process of either of the automatic vehicle stop control and the vehicle stop keeping control when a necessity for the emergency evacuation process arises, and outputs a command of the execution start of the emergency evacuation process when the intention of the driver indicates the execution start of the emergency evacuation process; and
a vehicle running control portion that executes the emergency evacuation process in response to the command from the emergency evacuation process execution judgment portion;
wherein the emergency evacuation process execution judgment portion is programmed to output the command of the execution start of the emergency evacuation process without conducting the intention confirmation process when a necessity for the emergency evacuation process arises in a stopped vehicle, and to start an execution of the vehicle stop keeping control as the emergency evacuation process.

2. The device of claim 1, wherein the device starts the execution of the emergency evacuation process without conducting the intention confirmation process when the necessity for the emergency evacuation process arises under a condition that the stopped vehicle has been stopped in accordance with a stop sign in a signal or a railroad crossing or in accordance with a road situation.

3. The device of claim 1, wherein when the necessity for the emergency evacuation process arises is when the driver inputs a command input of a request for the emergency evacuation process to a driver's command input portion or when a driver's physiological condition estimation portion that estimates a physiological condition of the driver detects an abnormality in the physiological condition of the driver.

4. The device of claim 1, executing in a running vehicle an automatic vehicle stop control as the emergency evacuation process, wherein, when the vehicle is running on a lane of a driveway or a highway, a travel path of the vehicle is controlled so that a stop site in the automatic vehicle stop control will be adjacent to an edge of the lane on which the vehicle is running closer to an opposite lane thereto, and wherein, when the vehicle is running on a lane of a normal road, a travel path of the vehicle is controlled so that a stop site in the automatic vehicle stop control will not be adjoined to either of both edges of the lane on which the vehicle is running.

5. The device of claim 4, wherein, if a road shoulder stoppable for the vehicle is detected when the vehicle is running on the lane of the driveway or highway, the travel path of the vehicle is controlled so that the stop site in the above-mentioned automatic vehicle stop control will be within the road shoulder.

6. The device of claim 1, further having a cancel command input portion which receives a driver's command of cancelling the execution of the emergency evacuation process, and the device being designed so that an override to the emergency evacuation process is permitted when the cancel command input portion receives the driver's command of cancelling after a start of the execution of the emergency evacuation process, wherein the device determines whether or not to permit the override to the emergency evacuation process based on a posture of a person riding in the vehicle irrespective of a presence or an absence of an acceptance of the cancelling command.

7. An emergency evacuation device of a vehicle that executes an emergency evacuation process of either of an automatic vehicle stop control and a vehicle stop keeping control, comprising:

an emergency evacuation process execution judgment portion which is programmed to conduct an intention confirmation process of confirming an intention of a driver for an execution start of the emergency evacuation process of either of the automatic vehicle stop control and the vehicle stop keeping control when a necessity for the emergency evacuation process arises, and outputs a command of the execution start of the emergency evacuation process when the intention of the driver indicates the execution start of the emergency evacuation process;

a vehicle running control portion that executes the emergency evacuation process in response to the command from the emergency evacuation process execution judgment portion; and an automatic vehicle stop control configured to be executed in a running vehicle as the emergency evacuation process, wherein, when the vehicle is running on a lane of a driveway or a highway, a travel path of the vehicle is controlled so that a stop site in the automatic vehicle stop control will be adjacent to an edge of the lane on which the vehicle is running closer to an opposite lane thereto, wherein, when the vehicle is running on a lane of a normal road, a travel path of the vehicle is controlled so that a stop site in the automatic vehicle stop control will not be adjoined to either of both edges of the lane on which the vehicle is running, wherein, if a road shoulder stoppable for the vehicle is detected when the vehicle is running on the lane of the driveway or highway, the travel path of the vehicle is controlled so that the stop site in the above-mentioned automatic vehicle stop control will be within the road shoulder, and wherein the emergency evacuation process execution judgment portion is programmed to output the command of the execution start of the emergency evacuation process without conducting the intention confirmation process when a necessity for the emergency evacuation process arises in a stopped vehicle, and to start an execution of the vehicle stop keeping control as the emergency evacuation process.

* * * * *